United States Patent Office
3,424,531
Patented Jan. 28, 1969

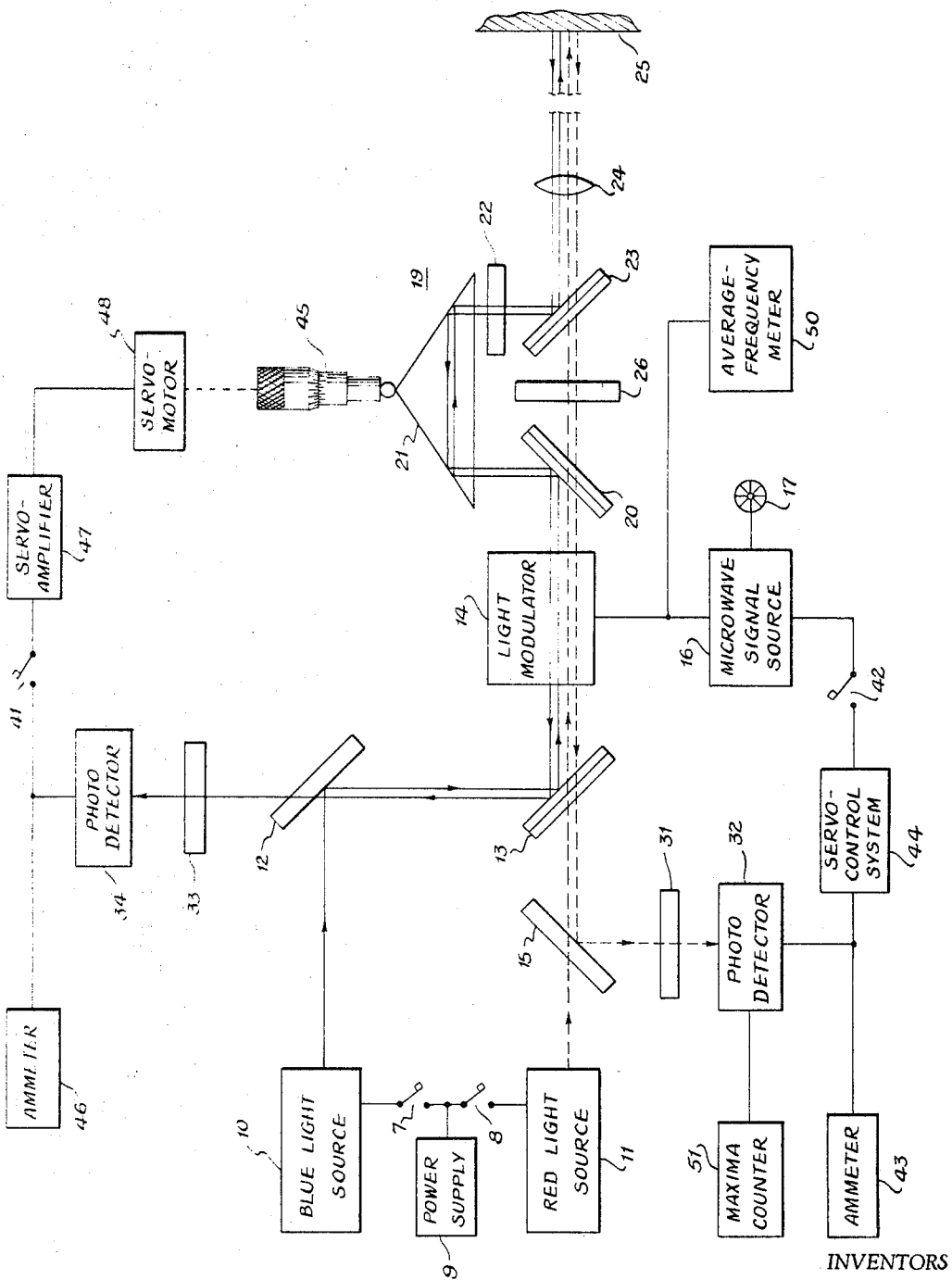
INVENTORS
Peter L. Bender
James C. Owens

3,424,531
DISTANCE MEASURING INSTRUMENT USING A PAIR OF MODULATED LIGHT WAVES
Peter L. Bender and James C. Owens, Boulder, Colo., assignors to the United States of America as represented by the Secretary of Commerce
Filed Sept. 17, 1965, Ser. No. 489,099
U.S. Cl. 356—4        6 Claims
Int. Cl. G01c 3/08

ABSTRACT OF THE DISCLOSURE

A first light beam passes through a modulator and over the path to be measured and returns over this path to the modulator. The value of the modulation frequency is varied until the length of the round-trip path is an integral number of modulation wavelengths. The number and the value of the modulation period are employed to calculate the apparent length of the path for the first beam. Simultaneously, a second light beam of another wavelength, modulated with the latter frequency, travels over substantially the entire path to be measured and a variable light path, and returns over these paths to the modulator. The length of the variable path is adjusted until the round-trip path of the second beam is an integral number of modulation wavelengths. The magnitude of this adjustment and the value of the modulation period, together with the atmospheric refractive index at the instrument, are used to calculate the difference in the apparent paths for the light beams. Finally, the information computed is utilized, along with certain published data, to determine the length of the measured path.

---

This invention relates to an optical distance measuring instrument and in particular to one that sends two modulated light waves over the atmospheric path to be measured.

In the prior art, one of the main limitations to the accuracy of measurements of long baselines by optical methods is the uncertainty in the average index of refraction over the optical path due to nonuniformity and turbulence of the atmosphere. This uncertainty is due primarily to lack of knowledge of the air density, although a small correction for water vapor is also required.

In one of the most widely used optical and microwave distance measuring instruments, an unfiltered mercury light is employed, the intensity of which is modulated at 30 mHz. The light beam is transmitted to a corner cube reflector positioned at one end of the path to be measured and is reflected back to the instrument. Interference between the 30 mHz. signal impressed on the beam to be transmitted and the signal received from the received beam is utilized to determine the electromagnetic distance between the instrument and the reflector. The geodetic distance is then obtained from the electromagnetic distance measurement by applying atmospheric refractive index corrections determined from measurements of pressure, temperature and humidity made at several points along the path. These meteorological measurements are inadequate to give the refractive index corrections to the desired accuracy. First, the accuracy of the data taken at each sampling station is insufficient. Second, even if the accuracy of the data were sufficient, it would still not be possible to find the correction to the desired accuracy because the correction involves an average over the path and practical sampling intervals cannot reproduce this average with sufficient precision.

Accordingly, it is an object of the present invention to provide an instrument that measures certain parameters that permit the calculation of the apparent length of a path and a correction for the length that is a function of the atmospheric composition, thus providing the true geodetic length.

Another object is to provide an optical distance measuring system that incorporates servo-control of a modulation frequency and of a variable light path, thereby reducing the effects of atmospheric turbulence on the measurement process.

In accordance with the present invention, a first light beam of a certain wavelength is modulated and is then sent over the path to be measured. The value of the modulation frequency is varied until the length of the path is an integral number of modulation wavelengths. This number and the value of the modulation period are then employed to calculate the apparent length of the path for the first beam. A second light beam of another wavelength is modulated with the latter modulation frequency and is transmitted over substantially the entire path to be measured and over a variable light path. When the apparent path for the first beam is an integral number of modulation wavelengths, the length of the variable path is adjusted until the apparent path for the second beam is an integral number of modulation wavelengths and the magnitude of the adjustment is measured. The magnitude of this adjustment and the value of the modulation period, together with the atmospheric refractive index at the instrument, are then used to calculate the difference in the apparent paths for the two light beams. Finally, the information computed above is utilized in Equations 13 to 16, along with certain published data, to determine the length of the measured path.

Description of instrument

The figure discloses an embodiment of the instrument used in making the measurements described in detail below. In the figure, when switches 7 and 8 are closed, power supply 9 energizes light sources 10 and 11, respectively. Source 10 contains a mercury lamp and a suitable filter, and emits a beam of blue light at a wavelength of 3660 A., while source 11 contains a helium-neon laser, emitting a beam of red light at 6328 A. The blue light is transmitted through beam splitter 12 and dichroic beam splitter 13 to light modulator 14, and the red beam is transmitted through beam splitters 15 and 13 to modulator 14. The modulator comprises a microwave cavity containing an electro-optical crystal, e.g., an ammonium dihydrogen phosphate crystal, or an optically active liquid, e.g., disulfide, a quarter wave plate, and a polarizer, e.g., a pair of Glan-Thompson polarizing prisms. A microwave voltage of selected frequency is applied to the modulator by microwave source 16.

After being modulated, the blue light beam is forced over a variable light path 19 that includes blue-reflecting dichroic beam splitter 20, prism-reflector 21, blue-transmitting filter 22, and blue-reflecting dichroic beam splitter 23. After leaving the variable light path, the blue light passes through lens 24 in an inverted telescope, not shown, to reflector 25 and is then returned over the path just indicated to modulator 14. In a similar manner, after being modulated the red light beam is sent through beam splitter 20, red-transmitting filter 26, beam splitter 23, and lens 24 to reflector 25 and is returned over the latter path. After the returned red and blue light pass through the modulator, the red light is deflected by beam splitter 15 through red-transmitting filter 31 to photo detector 32, while the blue light is deflected by beam splitter 13 and passes through blue-transmitting filter 33 to photo detector 34.

Modulator 14 is turned on and off at the modulation frequency generated by source 16 and controls the red and blue light beams in a way similar to that of a rotating tooth-wheel. Consider, for example, red light which initially passes through the modulator when its transmission is maximum. If the total optical path from the modulator to reflector 25 and back is a half-integral number of wavelengths of the modulation frequency, so that the transit time is a half-integral number of modulation periods, then the red light will arrive back at the modulator when the transmission is low. On the other hand, if the optical path is an integral number of modulation wavelengths, the red light will return when the modulator's transmission is again high. Thus, the light intensity at photo detector 32, averaged over a time interval that is long compared to the period of the modulation frequency, will be maximum when the transit time of the red light over the optical path is equal to an integral number of periods of the modulation frequency.

During the operations performed in the measurements described later, switch 8 is closed to energize source 11, which provides a red light beam. The modulation frequency of signal source 16 is then varied by means of dial 17 until ammeter 43 reads maximum. This indicates that the apparent path traversed by the red light is an integral number of modulation periods. Switch 42 is now closed to place servo-control system 44 in operation.

Switch 7 is closed to energize source 10 and thus provide a blue light beam. Micrometer 45 is manipulated to adjust the length of the path for the blue light until ammeter 46 reads maximum, indicating that the path of the blue light is an integral number of modulation periods. Switch 41 is now closed to place servo amplifier 47 and servo motor 48 in operation.

Servo control system 44, servo amplifier 47 and motor 48 maintain ammeters 43 and 46 at the maximum reading over the period during which the measurement is made. This avoids undesirable effects caused by atmospheric instability during the measurement period and increases the sensitivity of the instrument. The average modulation frequency over the measurement period is determined by average-frequency meter 50.

The output of photo detector 32 is fed to maxima counter 51 which registers the number of times that the output passes through maximum as signal source 16 is varied, by means of dial 17, over a selected frequency modulation range.

*Definition of terms*

In making measurements with the present instrument, a pulse of light travels from modulator 14 to reflector 25 and back. Hence, if T is the one-way transit time, an interval 2T is required for the pulse of light to travel out to the reflector and back. If the velocity U of light is known, the geodetic distance L may be found from the equation $$L = UT \tag{1}$$

The effect of the atmosphere is to reduce the velocity of light passing through it from the valve in vacuum, $c = 3 \times 10^{10}$ cm./sec., to some lower value U, given by $$U = c/n^G \tag{2}$$

where $n^G$ is the group refractive index of air. Hence the presence of the atmosphere increases the time required for a pulse of light to traverse the path. Because air is a dispersive medium (the refractive index varies with the wavelength of the light) and modulated light is used, the appropriate velocity U is the group velocity rather than the phase velocity, and therefore the group refractive index $n^G$ appears in Equation 2 rather than the usual refractive index, $n$. The quantities $n$ and $n^G$ are related by $$n^G = n + \sigma \frac{dn}{d\sigma} \tag{3}$$

where $\sigma$ is the wave number, the reciprocal of the optical wavelength in microns. It should be noted that if the refractive index is not constant over the path due to variations in pressure, temperature, or composition of the air, which will be the case for any actual path, the value of $n^G$ used in Equation 2 must be a suitably averaged value. To simplify the equations in this description, it will be assumed that all quantities referring to atmospheric effects, such as the refractive index, are suitably averaged quantities.

The increase in transit time of light, when transmitted in the atmosphere instead of in a vacuum, may be described mathematically as an increase in the apparent path length. This may be seen by substituting Equation 2 in Equation 1, obtaining $$L = \frac{c}{n^G} T \tag{4}$$

and then multiplying Equation 4 through by $n^G$ to give $$n^G L = cT \tag{5}$$

Since the transit time is increased due to the presence of the atmosphere, the apparent path $n^G L$ is longer than the path L. If the apparent path is represented by L' then $$L' = L + S \tag{6}$$

where S is the apparent increase in the path due to the atmosphere.

The refractive index and therefore S depend on the optical wavelength, and so the subscripts B and R are used with these quantities to indicate whether they refer to blue or to red light, respectively.

As indicated above, a maximum in the light intensity at photo detector 32 occurs whenever the round-trip transit time 2T is an integral multiple of the modulation period $t$. In this case a pulse of light emitted when modulator 14 is in the "on" condition returns when the modulator is again "on" and passes through to the detector. Therefore the transit time 2T is measured in units of the modulation period, and for the maximum condition we may write $$2T = \gamma t \tag{7}$$

where $\gamma$ is an integer. When the modulation frequency is set so that the light intensity detected is a maximum, the apparent path L' contains an integral number of modulation wavelengths, but the exact number $\gamma$ is not known. This ambiguity may be resolved by measuring the modulation frequencies, and hence modulation periods, of two successive maxima, for which the integer $\gamma$ differs by one. We may then write Equation 7 for each maximum $$2T = \gamma t_\gamma$$
$$2T = (\gamma + 1) t_{\gamma+1} \tag{8}$$

The transit time T is obviously the same for each case, and the modulation periods of the $\gamma^{th}$ and $(\gamma+1)^{th}$ maxima are denoted by $t_\gamma$ and $t_{\gamma+1}$, respectively. We thus have two equations in the two unknowns T and $\gamma$. Solving for $\gamma$, we have $$\gamma = t_{\gamma+1} / (t_\gamma - t_{\gamma+1}) \tag{9}$$

Therefore $\gamma$ is known, and the transit time may be found from either of Equations 8; the ambiguity is resolved. Having thus measured the transit time T, the apparent path length L' is found by multiplying T by the velocity of light in vacuum, as shown in Equations 5 and 6

$$L + S_R = cT \tag{10}$$

In practice, it is difficult to measure the small difference $(t_\gamma - t_{\gamma+1})$ with the necessary accuracy of 1 part in 300,000, and therefore it is desirable to measure the modulation periods not of adjacent maxima but of two maxima separated as widely as possible, as for instance the 300,000th and the 300,500th one. This may be achieved by taking the first measurement at the first maximum reading of ammeter 43, as noted above. The modulation frequency generated by source 16 is then increased continuously until counter 51 reads the 300,500th maxima traversed when the second measurement is taken.

Quantities measured and calculated

There are three parts to the determination of the geodetic distance L: (1) the measurement of the number of modulation periods in the apparent length, $L+S$, for one color of light, and the calculation of the apparent length, (2) the measurement of the increase in length of variable light path 19 required to obtain an integral number of the latter modulation periods for the other color of light, and the calculation of the difference in the apparent paths for the two colors, $\Delta S$, and (3) the calculation of the geodetic distance L, using the information obtained in the two parts just indicated, certain published data and Equations 13 to 16 below.

In the example of the measurements that follow, the measurement required for the calculation of $L+S$ is made using the red light, and it is assumed that the geodetic distance L between modulator 14 and reflector 25 is approximately 15 km., so that the total path is 30 km. $S_R$ will then be about 400 cm. and the difference $$\Delta S = S_B - S_R$$

will be about 40 cm.

A. Determination of the apparent path length for red light

After switch 8 is closed to energize red light source 11, the modultaion frequency provided by source 16 is adjusted until maximum light energy is detected by photo detector 32 at the 300,000th maxima indicated on counter 51. Switch 42 is now closed and servo system 44 controls source 16 to maintain maximum energy on the detector. Meter 50 now indicates the average modulation frequency over the time interval of the measurement from which the modulation being period $t_{\gamma+300,000}$ is determined.

The modulation frequency is increased continuously until counter 51 reads the 300,500th maxima traversed by detector 32. Meter 50 now indicates the average modulation frequency from which the modulation period $t_{\gamma+300,500}$, is determined. Using Equations 8, 9, and 10, the apparent path length for the red light, $L+S_R$, is calculated.

B. Determination of difference in apparent paths

First a simple method and then a preferred one for determining $\Delta S$ will be described.

(1) *Simple method.*—The apparent path $L'$ is measured as described above, first for the red light and then for the blue light, giving the quantities $(L+S_R)$ and $(L+S_B)$, respectively. The difference $\Delta S$ is then found by subtraction.

$$(L+S_B) - (L+S_R) = S_B - S_R = \Delta S \qquad (11)$$

(2) *Preferred method.*—In practice, it is undesirable to measure the apparent path length for the red and blue light separately and to subtract, for $\Delta S$ is a small number compared to the apparent total path for either color, and the accuracy with which the difference would be found is poor. Even more imporant, the atmospheric density and composition vary rapidly, and the apparent path length for either color would probably change in the interval between the two measurements, giving rise to a large error in $\Delta S$. Therefore, a simultaneous measurement of the apparent path lengths is desirable. The present instrument, in effect, not only permits this simultaneity of measurement, but also provides a means for determining the difference $\Delta S$.

The first step in this method is to determine the effective modulation point from which the geodetic length L is measured and to adjust the variable light path 19. This is accomplished as follows: red light source 11 is energized, and the modulation frequency, developed by source 16, is set at some convenient value. A calibrating mirror, not shown, is placed in front of lens 24 at such a position that ammeter 43 reads maximum. The distance between the effective modulation point of modulator 14 and the mirror is then an integral number, $\alpha$, of modulation wavelengths. The number, $\alpha$, is found by calculation from the modulation frequency on meter 50 and the approximate distance between the modulator and mirror, obtained by measurement. The position of the effective modulation point is then located.

Switch 7 is closed, turning on blue light source 10. In general there will not be an intensity maximum on detector 34 since the blue light traverses an additional path over variable light path 19 and back, not traversed by the red light. Accordingly, micrometer 45 is manipulated to position prism-reflector 21 to obtain maximum deflection on ammeter 46, and the position of the prism, $Z_0$, is read on the scale of micrometer 45 whose zero indicates the position of the prism when located at the point of the undeviated red and blue beams. The additional path traversed by the blue light, compared to the red, is $4Z_0$ which will be an integral number, $\beta$, of modulation wavelengths, generally one. The difference in propagation velocities for the two colors of light is negligible over this short distance, and the fact that the blue light, but not the red, traverses variable light path 19 causes no difficulty.

Next, the apparent path length to reflector 25 for red light is determined. This is achieved as follows: the calibration mirror is removed, the blue light source 10 is turned off, and the red light source 11 is turned on. The modulation frequency, provided by source 16, is adjusted to obtain a selected maximum reading on ammeter 43, and switch 42 is closed to maintain the reading maximum under control of servo-control system 44. The round-trip path of the red light between the effective modulation point and reflector 25 is now an integral number $\gamma$ of modulation wavelengths. The ambiguity in $\gamma$ is resolved and the length of the path, $L+S_R$, is calculated as described above.

Finally, $\Delta S$ is determined. Switch 7 is closed, turning blue light source 10 on. The intensity of the blue light will not in general provide a maximum on ammeter 46, because it appears to travel the additional distance $\Delta S$ compared with the red light, which generally will not be an integral number of modulation wavelengths. The blue light intensity is therefore maximized by moving prism-reflector 21 to a new position Z, increasing the blue path by the necessary fraction of a wavelength. After a maximum reading is obtained on ammeter 46, switch 41 is closed to maintain this reading under control of servo amplifier 47 and servo motor 48.

The total apparent round-trip path for the blue light now exceeds the total apparent round-trip path for the by an integral $\delta$ of the modulation wavelength $\lambda$. Of this distance $\delta\lambda$, a part $(4Z_0 = \beta\lambda)$ was the original contribution of variable light path 19 and a part $4(Z-Z_0)$ was added to make the total distance for the blue an integral number of modulation wavelengths. Hence the atmospheric contribution to the apparent round-trip path for the blue light is the remainder $$2\Delta S = (\delta - \beta)\lambda - 4(Z-Z_0) \qquad (12)$$

The value of $\delta$ is an integer, which is determined as follows. The refractive index at the instrument is found from measurements of atmospheric pressure, temperature and relative humidity. Then, the value of $\delta$ is calculated from the approximate length of the roundtrip path and the modulation frequency, using Equations 5 and 7. The value of $\beta$ is determined from appropriate measurements when the instrument is constructed, and the displacement $(Z-Z_0)$ is measured on the scale of micrometer 45. Finally, the value of $\Delta S$ is calculated from the information just indicated.

C. Calculation of atmospheric correction

Having determined $(L+L_R)$ and $\Delta S$, the contribution $S_R$ is calculated and the geodetic distance L is found. $S_R$ is related to $\Delta S$ by $$\Delta S = \overline{A} S_R \qquad (13)$$

where the quantity A is given by $$A = \frac{n_B{}^G - n_R{}^G}{n_R{}^G - 1} \qquad (14)$$

and the bar over A in Equation 13 indicates that the average composition of the atmosphere over the path is to be used in finding $\overline{A}$. Because the refractivity ($n^G-1$) is proportional to density, the quantity A, involving a ratio of refractivities, is independent of the atmospheric density along the path and may be calculated from laboratory data. In addition, the quantities ($n^G-1$) and A are only weakly dependent on the atmospheric composition. This means that the correction $S_R$ may be calculated from the measured $\Delta S$ without careful and extensive meteorological measurements along the path. In order to find L to one part per million, the quantity $S_R$ must be known to an accuracy of one part in 300, and so $\overline{A}$ must be known to the same accuracy or better. A change in the water vapor content from 0% to 60% relative humidity changes the quantity A by this amount, 1 part in 300. Therefore, to achieve the stated accuracy of 1 p.p.m. in L, the relative humidity need only be known within 50%, and for dry, uniform paths, this correction may be neglected. For other paths, a rough knowledge of the water vapor content (and, if necessary, the carbon dioxide concentration) is available from independent radio frequency, microwave, or infrared measurements, so that the proper value of A can be calculated.

The calculation of A is made using the published refractive index data of several authors. The classic paper, giving a general formula for the refractive index of air under various conditions, is entitled "The Refraction and Dispersion of Air for the Visible Spectrum" by H. Barrell and J. E. Sears, Jr., Phil. Trans. Roy. Soc., vol. A238, pp. 1–64 (1940). Improved values of the constants appearing in the formulas for dry air are given by B. Edlen in "The Dispersion of Standard Air," J. Opt. Soc. Am., vol. 43, pp. 339–344 (1953) and by K. F. Svensson in "Measurements of the Dispersion of Air for Wavelengths from 2302 to 6907 A.," Arikiv Fysik, vol. 16, pp. 361–384 (1960), while improved values for the constants in the water vapor terms are given by K. E. Erickson in a paper entitled "Investigations of the Invariance of Atmospheric Dispersion With a Long-Path Refractometer," J. Opt. Soc. Am., vol. 52, pp. 777–780 (1962). By combining these results, using the improved parameters of later authors in the general formula of Barrell and Sears, the best overall formula for the refractive index $n$ may be obtained. The group refractive index $n^G$, required for the calculation of A according to Equation 14, is obtained from this formula by applying Equation 3. The value of A is approximately 0.10.

Having measured $\Delta S$ and calculated $\overline{A}$, we may obtain $S_R$ from Equation 13, finding $$S_R = \Delta S / \overline{A} \qquad (15)$$

The geodetic distance L is then obtained by subtraction from the calculated apparent length for red light.

$$L' = (L + S_R) - S_R \qquad (16)$$

Modifications

Many variations and modifications of the present invention are possible in the light of the above principles. It will be apparent, for example, that various types of polarization modulation of the light beams could be used to permit electronic cancellation of the amplitude fluctuations due to the inhomogeneous atmosphere. The use of dual-channel detection of the polarization modulated light would effectively double the transmitting power of the system, and the use of synchronous detection techniques would increase the range by increasing the signal to noise ratio of the system. It is therefore to be understood that within the scope of the appended claims, the invention may be practiced otherwise than as specifically described.

What is claimed is:

1. An optical distance measuring instrument comprising:
   means for generating a first and second light beam having a first and second wavelength, respectively,
   means for modulating simultaneously said first and second beams over a selected range of modulation frequencies,
   a predetermined light path,
   means for directing the modulated first beam over said predetermined path,
   a variable light path,
   means for directing the modulated second beam over said variable path and over substantially the entire length of said predetermined path,
   means located at one end of said predetermined path for re-directing said first beam over said predetermined path and for re-directing said second beam over said variable path and over substantially the entire length of said predetermined path,
   means for adjusting the modulation frequency of said modulating means,
   means for determining when the sum of said predetermined path and the related return path is an integral number of wavelengths of a selected one of said modulation frequencies,
   means for adjusting the length of said variable path over a selected range, and
   means for determining when the sum of the length of said variable path, substantially the entire length of the predetermined path, and the related return path is an integral number of wavelengths of said selected modulation frequency.

2. An optical distance measuring instrument comprising:
   a first light source generating a first light beam of one wavelength,
   a second light source generating a second light beam of another wavelength,
   a light modulator positioned in the path of said beams,
   signal generating means for developing a modulation signal having a frequency that can be varied over a selected range,
   means for applying said signal to the modulator,
   means for sending said first and second beams through said modulator, thereby creating a modulated first beam and a modulated second beam,
   a predetermined light path,
   means for transmitting the modulated first beam over said predetermined path,
   a variable light path, means for adjusting the length of said variable light path over a selected range,
   means for transmitting the modulated second beam over said variable path and over substantially the entire length of said predetermined path,
   means located at one end of said predetermined path for retransmitting said first beam over said predetermined path and said second beam over said variable path and over substantially the entire length of said predetermined path and through said modulator,
   first indicating means responsive to said first beam retransmitted through said modulator for indicating when the round trip path of the first beam is an integral number of modulated wavelengths,
   second indicating means responsive to said second beam retransmitted through said modulator for indicating when the round trip path of the second beam is an integral number of modulated wavelengths.

3. The instrument set forth in claim 2 including a servo control system positioned between said first indicating means and said signal generating means, and a servo control system positioned between said second indicating means and said means for adjusting said variable light path.

4. The instrument set forth in claim 2 including an average-frequency meter, and means for connecting said average-frequency meter to the output of said signal generating means.

5. The instrument set forth in claim 2 wherein said first indicating means includes a first photo detector and an ammeter connected to the output of said first photo detector, and wherein said second indicating means includes a second photo detector, and an ammeter connected to the output of said second photo detector.

6. The instrument set forth in claim 2 including a maxima counter, and means for connecting said maxima counter to the output of said first indicating means.

No references cited.

JEWELL H. PEDERSEN, *Primary Examiner.*

F. L. EVANS, *Assistant Examiner.*

U.S. Cl. X.R.

250—200